US010419920B2

(12) United States Patent
Wang (10) Patent No.: US 10,419,920 B2
(45) Date of Patent: *Sep. 17, 2019

(54) NETWORK REGISTRATION METHOD FOR MOBILE TERMINAL, STORAGE MEDIUM, AND MOBILE TERMINAL

(71) Applicant: GUANGDONG OPPO MOBILE TELECOMMUNICATIONS CORP., LTD., Dongguan, Guangdong (CN)

(72) Inventor: Xukang Wang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,705

(22) Filed: Nov. 27, 2018

(65) Prior Publication Data

US 2019/0141514 A1 May 9, 2019

Related U.S. Application Data

(63) Continuation of application No. 16/072,025, filed as application No. PCT/CN2017/088117 on Jun. 13, 2017.

(30) Foreign Application Priority Data

Jun. 21, 2016 (CN) .......................... 2016 1 0460475

(51) Int. Cl.
*H04W 4/00* (2018.01)
*H04W 8/06* (2009.01)
(Continued)

(52) U.S. Cl.
CPC ............. *H04W 8/06* (2013.01); *H04W 60/00* (2013.01); *H04W 60/04* (2013.01); *H04W 88/02* (2013.01)

(58) Field of Classification Search
CPC ..... H04W 36/14; H04W 48/16; H04W 88/06; H04W 48/18
See application file for complete search history.

(56) References Cited

U.S. PATENT DOCUMENTS 9,071,951 B2 * 6/2015 Arvidsson ............... H04W 8/16
10,097,987 B2 * 10/2018 Jin ......................... H04W 60/04
(Continued)

FOREIGN PATENT DOCUMENTS

| CN | 102256323 A | 11/2011 |
| CN | 103747469 A | 4/2014 |

(Continued)

OTHER PUBLICATIONS

PCT/CN2017/088117 English translation of International Search Report dated Aug. 24, 2017, 2 pages.
(Continued)

*Primary Examiner* — Shantell L Heiber
(74) *Attorney, Agent, or Firm* — Lathrop Gage LLP (57) ABSTRACT

Provided are a network registration method for a mobile terminal, a mobile terminal and a storage medium. The network registration method for a mobile terminal is implemented as follows. An element $T_i$ in a time array is read in response of determining that a predetermined abnormal event occurs when a mobile terminal registers a first network. i is a positive integer between 1 and N, and N is a positive integer. The mobile terminal is prohibited from registering the first network. The mobile terminal is controlled to register a second network. A timer is started for timing to obtain a first counted time. It is determined whether the first counted time reaches $T_i$. A first identity is acquired if the first counted time reaches $T_i$. The first identifier is a tracking area identity of an adjacent cell of a registered cell when the first network is registered. The
(Continued)

mobile terminal is controlled to re-register the first network again according to the first identity.

12 Claims, 4 Drawing Sheets

(51) Int. Cl.
*H04W 60/00* (2009.01)
*H04W 60/04* (2009.01)
*H04W 88/02* (2009.01)

(56) References Cited

U.S. PATENT DOCUMENTS

| | | | |
|---|---|---|---|
| 2011/0263239 A1 | 10/2011 | Yamagishi et al. | |
| 2012/0258766 A1* | 10/2012 | Cho | H04W 8/08 455/525 |
| 2015/0131437 A1* | 5/2015 | Kim | H04W 28/0289 370/230 |
| 2015/0245256 A1* | 8/2015 | Kiss | H04W 76/18 455/436 |

FOREIGN PATENT DOCUMENTS

| | | |
|---|---|---|
| CN | 103906090 A | 7/2014 |
| CN | 104581675 A | 4/2015 |
| CN | 104602292 A | 5/2015 |
| CN | 105472677 A | 4/2016 |
| CN | 105933884 A | 9/2016 |
| CN | 105933884 B | 3/2018 |

OTHER PUBLICATIONS

PCT/CN2017/088117 International Search Report and Written Opinion dated Aug. 24, 2017, 7 pages.
Chinese Patent Application No. 201610460475.8 First Office Action dated Jun. 2, 2017, 8 pages.
Chinese Patent Application No. 201610460475.8 English translation of First Office Action dated Jun. 2, 2017, 10 pages.
Chinese Patent Application No. 201610460475.8 Second Office Action dated Aug. 8, 2017, 8 pages.
Chinese Patent Application No. 201610460475.8 English translation of Second Office Action dated Aug. 8, 2017, 13 pages.
Chinese Patent Application No. 201610460475.8 Third Office Action dated Oct. 17, 2017, 3 pages.
Chinese Patent Application No. 201610460475.8 English translation of Third Office Action dated Oct. 17, 2017, 5 pages.
Chinese Patent Application No. 201610460475.8 Fourth Office Action dated Jan. 1, 2018, 3 pages.
Chinese Patent Application No. 201610460475.8 English translation of Fourth Office Action dated Jan. 1, 2018, 5 pages.
Chinese Patent Application No. 201610460475.8 Notification to Grant Patent Right for Invention dated Feb. 24, 2018, 1 page.
Chinese Patent Application No. 201610460475.8 English translation of Notification to Grant Patent Right for Invention dated Feb. 24, 2018, 2 pages.
Chinese Patent Application No. 201610460475.8 First Search dated May 19, 2017, 2 pages.
Chinese Patent Application No. 201610460475.8 Supplemental Search dated Dec. 13, 2017, 1 page.
Chinese Patent Application No. 201610460475.8 Supplemental Search dated Feb. 5, 2018, 1 page.
Chinese Patent Application No. 201610460475.8 English translation of Allowed claims as of Feb. 24, 2018. 4 pages.

* cited by examiner

Fig. 5

NETWORK REGISTRATION METHOD FOR MOBILE TERMINAL, STORAGE MEDIUM, AND MOBILE TERMINAL

CROSS REFERENCE TO RELATED APPLICATIONS

This application is a Continuation Application of U.S. application Ser. No. 16/072,025, filed Jul. 23, 2018, which is a National Stage Entry of International Application No. PCT/CN2017/088117, filed Jun. 13, 2017 which claims priority to Chinese Patent Application No. 201610460475.8 filed by on Jun. 21, 2016 and titled with "NETWORK REGISTRATION METHOD AND APPARATUS FOR MOBILE TERMINAL, AND MOBILE TERMINAL", the entire contents of which are incorporated herein by reference.

FIELD

The present disclosure relates to the communication technology field, and more particularly, to a network registration method of a mobile terminal, a storage medium and a mobile terminal.

BACKGROUND

With continuous development of communication technologies, most areas of the country have been covered by 4G network, and users can quickly access to Internet by connecting the mobile terminals to the 4G network. In the related art, when the mobile terminal receives a response indicating that TAU (Tracking Area Update) is rejected, the mobile terminal stops registering the 4G network and does not search for networks of cells with different TAI (Tracking Area Identity).

In this way, when the current TAU is rejected by the network, a success rate of registering the network by the mobile terminal is low.

SUMMARY

The present disclosure aims to solve at least one of the problems existing in the related art to some extent at least.

Embodiments of the present disclosure provide a network registration method of a mobile terminal. The method includes: reading an element $T_i$ in a time array $\{T_1, T_2, \ldots, T_i, \ldots, T_n\}$ in response to determining that a predetermined abnormal event occurs when the mobile terminal registers a first network, wherein i is a positive integer between 1 and N, and N is a positive integer, the predetermined abnormal event comprises tracking area update (TAU) being rejected, values of the elements $T_i$ in the time array are sequentially input by the user on the screen or selectively input by the user; prohibiting the mobile terminal from registering the first network, and controlling the mobile terminal to register a second network; starting a timer for timing, to obtain a first counted time; determining whether the first counted time reaches $T_i$; obtaining a first identity when the first counted time reaches $T_i$, wherein the first identity is a tracking area identity of an adjacent cell of a cell where the mobile terminal is when registering the first network; and controlling the mobile terminal to re-register the first network according to the first identity. After controlling the mobile terminal to re-register the first network according to the first identity, the method further includes: determining whether the predetermined abnormal event occurs when the mobile terminal re-registers the first network; when the predetermined abnormal event occurs, controlling the mobile terminal to re-register the second network, and resetting the timer for timing again to obtain a second counted time; alternately reading an element $T_{i+1}$ in the time array $\{T_1, T_2, \ldots, T_i, \ldots, T_n\}$, and determining whether the second counted time reaches $T_{i+1}$; obtaining a second identity when the second counted time reaches $T_{i+1}$, wherein the second identity is a tracking area identity of an adjacent cell of a cell where the mobile terminal is registered when re-registering the first network; and controlling the mobile terminal to re-register the first network according to the second identity; obtaining information about TAU being rejected, and sending the information to a server, such that the server backs up the predetermined abnormal event according to the information.

Embodiments of the present disclosure provide a mobile terminal. The mobile terminal includes a housing, a processor, a memory, a circuit board and a power supply circuit. The circuit board is disposed inside a space enclosed by the housing. The processor and the memory are disposed on the circuit board. The power supply circuit is configured to supply power for respective circuits or components of the mobile terminal. The memory is configured to store executable program codes. The processor is configured to run a program corresponding to the executable program codes by reading the executable program codes stored in the memory, so as to perform: reading an element $T_i$ in a time array $\{T_1, T_2, \ldots, T_i, \ldots, T_n\}$ in response to determining that a predetermined abnormal event occurs when the mobile terminal registers a first network, wherein i is a positive integer between 1 and N, and N is a positive integer, the predetermined abnormal event comprises tracking area update (TAU) being rejected, values of the elements $T_i$ in the time array are sequentially input by the user on the screen or selectively input by the user; prohibiting the mobile terminal from registering the first network, and controlling the mobile terminal to register a second network; starting a timer for timing, to obtain a first counted time; determining whether the first counted time reaches $T_i$; obtaining a first identity when the first counted time reaches $T_i$, wherein the first identity is a tracking area identity of an adjacent cell of a cell where the mobile terminal is when registering the first network; and controlling the mobile terminal to re-register the first network according to the first identity. The processor is further configured to: determine whether the predetermined abnormal event occurs when the mobile terminal re-registers the first network; when the predetermined abnormal event occurs, control the mobile terminal to re-register the second network, and reset the timer for timing again to obtain a second counted time; alternately read an element $T_{i+1}$ in the time array $\{T_1, T_2, \ldots, T_i, \ldots, T_n\}$, and determine whether the second counted time reaches $T_{i+1}$; obtain a second identity when the second counted time reaches $T_{i+1}$, wherein the second identity is a tracking area identity of an adjacent cell of a cell where the mobile terminal is when re-registering the first network; and control the mobile terminal to re-register the first network according to the second identity; obtain information about TAU being rejected, and sending the information to a server, such that the server backs up the predetermined abnormal event according to the information.

Embodiments of the present disclosure provide a non-transitory storage medium. When instructions stored in the storage medium are executed by a processor of a mobile terminal, the mobile terminal is caused to perform a network registration method. The method includes: reading an element $T_i$ in a time array $\{T_1, T_2, \ldots, T_i, \ldots, T_n\}$ in response to determining that a predetermined abnormal event occurs when the mobile terminal registers a first network, wherein i is a positive integer between 1 and N, and N is a positive integer, the predetermined abnormal event comprises tracking area update (TAU) being rejected, values of the elements $T_i$ in the time array are sequentially input by the user on the screen or selectively input by the user; prohibiting the mobile terminal from registering the first network, and controlling the mobile terminal to register a second network; starting a timer for timing, to obtain a first counted time; determining whether the first counted time reaches $T_i$; obtaining a first identity when the first counted time reaches $T_i$, wherein the first identity is a tracking area identity of an adjacent cell of a cell where the mobile terminal is when registering the first network; and controlling the mobile terminal to re-register the first network according to the first identity. After controlling the mobile terminal to re-register the first network according to the first identity, the method further includes: determining whether the predetermined abnormal event occurs when the mobile terminal re-registers the first network; when the predetermined abnormal event occurs, controlling the mobile terminal to re-register the second network, and resetting the timer for timing again to obtain a second counted time; alternately reading an element $T_{i+1}$ in the time array $\{T_1, T_2, \ldots, T_i, \ldots, T_n\}$, and determining whether the second counted time reaches $T_{i+1}$; obtaining a second identity when the second counted time reaches wherein the second identity is a tracking area identity of an adjacent cell of a cell where the mobile terminal is registered when re-registering the first network; and controlling the mobile terminal to re-register the first network according to the second identity; obtaining information about TAU being rejected, and sending the information to a server, such that the server backs up the predetermined abnormal event according to the information.

It is to be understood that, both the foregoing general description and the following detailed description are exemplary and explanatory only and are not restrictive of the present disclosure.

BRIEF DESCRIPTION OF THE DRAWINGS

In order to explain technical solutions of the present disclosure more clearly, drawings required to be used in the description of embodiments will now be illustrated briefly. Obviously, drawings in the following description are some embodiments of the present disclosure, and further drawings can be obtained by those skilled in the art based on these drawings, without creative labor.

DETAILED DESCRIPTION

Technical solutions in embodiments of the present disclosure will be described clearly and completely in the following with reference to drawings in embodiments of the present disclosure. Obviously, the embodiments described are merely illustrative, and are not exhaustive. All other embodiments obtained by those skilled in the art based on the embodiments of the present disclosure without creative labor belong to the protection scope of the present disclosure.

Terms such as "first", "second", "third" and "four" in the description, claims and drawings of the present disclosure are used to distinguish different objects, and are not used to describe specific order. In addition, terms such as "including" and "having" and their variants intend to cover non-exclusive inclusion. For example, procedures, methods, systems, products or apparatus including a series of steps or units are not limited to listed steps or units, but alternatively further include steps or units which are not listed, or alternatively further include other steps or units inherent to these procedures, methods, products and apparatus.

Figure 1:
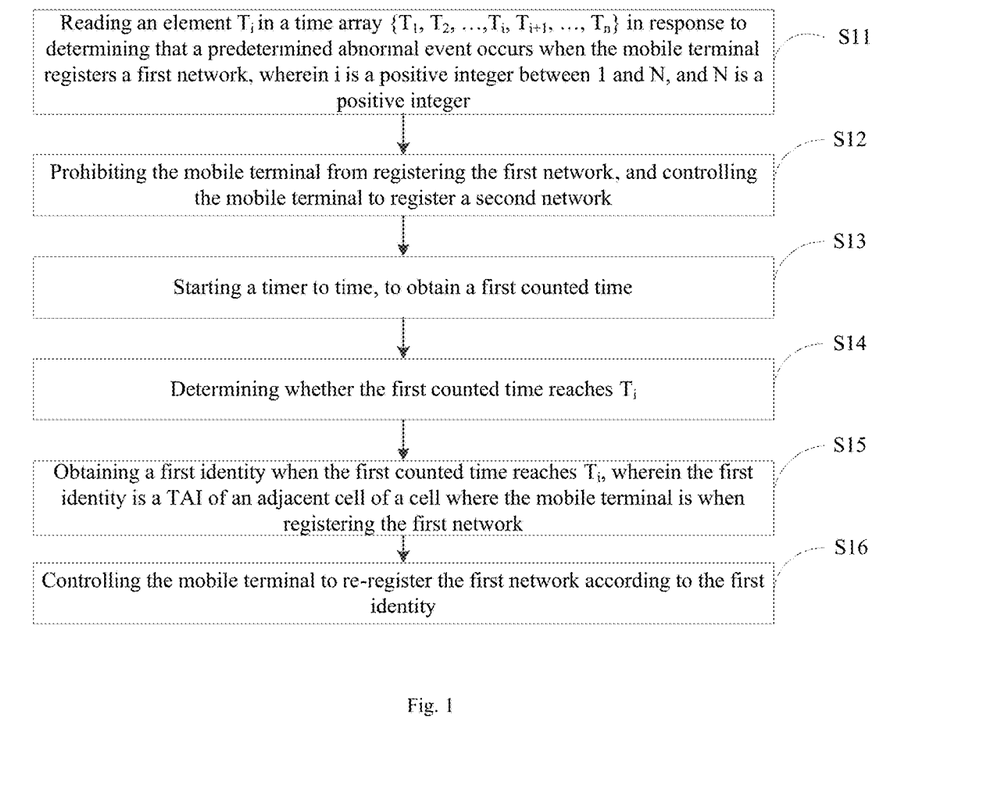
FIG. 1 is a flow chart of a network registration method of a mobile terminal according to an embodiment of the present disclosure.

FIG. 1 is a flow chart of a network registration method of a mobile terminal according to an embodiment of the present disclosure. The network registration method is configured in a network registration apparatus of a mobile terminal for illustration. Embodiments of the present disclosure may be applied in a procedure when the user uses the mobile terminal to register 4G network, or may be applied in a procedure of registering 3G network or 2G network, which are not limited. The mobile terminal may be hardware devices with various operating systems, such as a smart phone, a tablet PC, a PDA, and an E-book.

The network registration method of the mobile terminal can include following actions in blocks illustrated in FIG. 1. The method can begin at block S11.

At block S11, an element $T_i$ in a time array is read in response to determining that a predetermined abnormal event occurs when the mobile terminal registers a first network, in which the time array is $\{T_1, \ldots, T_2, T_i, T_{i+1}, \ldots, T_n\}$, is a positive integer between 1 and N, and N is a positive integer.

Embodiments of the present disclosure are illustrated in a case in which the mobile terminal registers the 4G network.

The execution body of embodiments of the present disclosure may be, for example, a built-in modem of the mobile terminal.

Alternatively, the predetermined abnormal event includes TAU being rejected.

The first network is 4G network.

It can be understood that, during the procedure in which the user uses the mobile terminal to access the 4G network, a response indicting a failure of registering the network may occur, in which the failure of registering the network may be caused by the TAU being rejected, or may be caused by other reasons.

In embodiments of the present disclosure, when the mobile terminal fails to register the network due to the TAU being rejected, the time array may be started and the element $T_i$ in the time array may be read. For example, when the mobile terminal initially fails to register the first network, the element $T_1$ may be read from the time array $\{T_1, T_2, \ldots, T_i, T_{i+1}, \ldots, T_n\}$, and the mobile terminal is controlled to register the network with different rate, for example, 2G network or 3G network, during the time interval of $T_1$, to ensure that the mobile terminal can normally access to Internet. When the mobile fails to register the first network the second time, the element $T_2$ may be read from the time array $\{T_1, T_2, \ldots, T_i, T_{i+1}, \ldots, T_n\}$, and so on. The element $T_i$ in the time array $\{T_1, T_2, \ldots, T_i,$ $T_{i+1}, \ldots, T_n\}$ is read alternately, to enhance the success rate of registering the first network by the mobile terminal, which is not limited.

A value of the element $T_i$ in the time array may be set by the user based on his own demand, or may be preset by the manufacturer of the mobile terminal, which is not limited.

At S12, the mobile terminal is prohibited from registering the first network, and is controlled to register a second network.

In embodiments of the present disclosure, the second network has a transmission rate different from the first network. For example, the second network may be 2G network, or 3G network, which is not limited.

In embodiments of the present disclosure, when the mobile terminal initially fails to register the first network and when the mobile terminal fails to register the first network due to the TAU being rejected, it is possible to control the mobile terminal to switch to register the network with different rate, for example, 2G network or 3G network, in the time interval of $T_1$. Alternatively, when the mobile terminal alternately reads the element $T_i$ in the time array $\{T_1, T_2, \ldots, T_i, T_{i+1}, \ldots, T_n\}$, the mobile terminal may switch to register the network with different rate in the time interval of thus effectively ensuring that the mobile terminal can normally access to Internet.

At S13, the timer is started to time, to obtain a first counted time.

In embodiments of the present disclosure, while the mobile terminal is prohibited from registering the first network and is controlled to register the second network, the timer may be started to time, to obtain the first counted time. The mobile terminal may determine whether the duration of registering the second network reaches $T_i$ according to the first counted time, which is not limited.

At S14, it is determined whether the first counted time reaches $T_i$.

In embodiments of the present disclosure, it is possible to determine whether the first counted time reaches $T_i$, to determine whether to trigger the mobile terminal to re-register the first network, which is not limited.

Figure 2:
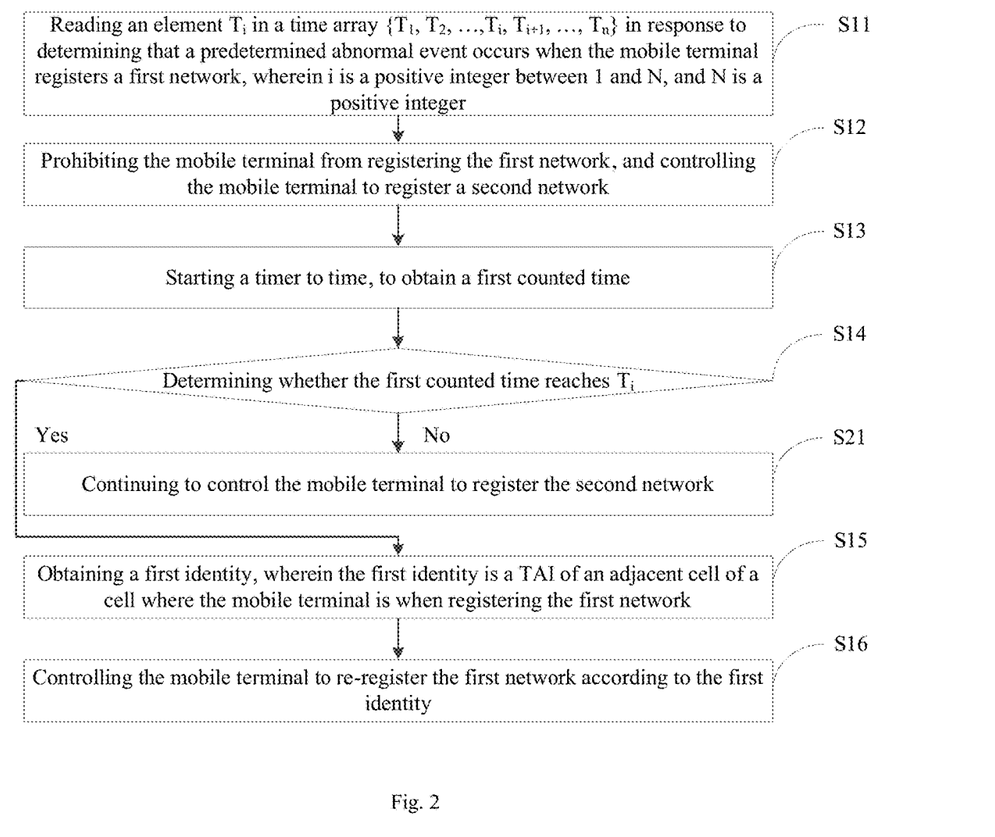
FIG. 2 is a flow chart of a network registration method of a mobile terminal according to another embodiment of the present disclosure.

In some embodiments, as illustrated in FIG. 2, following action may be performed after S14.

At S21, when the first counted time does not reach $T_1$, the mobile terminal is continuously controlled to register the second network.

In this action, by continuing to control the mobile terminal to register the second network when the first counted time does not reach $T_i$, it can ensure that the user can register the network with different rate when the TAU is rejected by the network, avoiding the connectionless network service state, and effectively improving the user experience.

At S15, when the first counted time reaches $T_i$, a first identity is obtained, in which the first identity is the TAI of an adjacent cell of a cell where the mobile terminal is when registering the first network.

In embodiments of the present disclosure, when the first counted time reached $T_i$, the TAI of the adjacent cell of the cell where the mobile terminal is when registering the first network may be obtained, to control the mobile terminal to re-register the first network according to the TAI of the adjacent cell.

The TAI of the adjacent cell of the cell where the mobile terminal is when registering the first network may be obtained by technologies in the related art, which will not be elaborated here.

At S16, the mobile terminal is controlled to re-register the first network according to the first identity.

In embodiments of the present disclosure, when the mobile terminal fails to register the first network the first time due to the TAU being rejected, the mobile terminal reads the element $T_1$ in the time array $\{T_1, T_2, \ldots, T_i, T_{i+1}, \ldots, T_n\}$. In the time interval of $T_1$, the mobile terminal is prohibited from registering the first network, but switches to register the second network, and accesses to the second network in the time interval of $T_1$. Then, when the counted time of the times reaches $T_1$, the mobile terminal is controlled to re-register the first network according to the TAI of the adjacent cell. If the registration successes, the mobile terminal accesses to the first network. If the registration fails, the mobile terminal reads the element $T_2$ in the time array $\{T_1, T_2, \ldots, T_i, T_{i+1}, \ldots, T_n\}$ and resets the timer for timing again, and switches to register the second network again in the time interval of $T_2$. When the re-counted time reaches $T_2$, the mobile terminal is controlled to register the first network again according to the TAI of the adjacent cell of the cell where the mobile terminal is when registering the first network the second time. By that analogy, the element $T_i$ in the time array $\{T_1, T_2, \ldots, T_i, T_{i+1}, \ldots, T_n\}$ is read alternately, until the mobile terminal registers the first network successfully, which is not limited.

In this embodiment, by controlling the mobile terminal to register the second network when the predetermined abnormal event occurs during the mobile terminal registers the first network, it can ensure that the user registers the network successfully, and by obtaining the first identity (the TAI of the adjacent cell of the cell where the mobile terminal is when registering the first network) when the first counted time reaches $T_i$, and controlling the mobile terminal to re-register the first network according to the first identity, the mobile terminal can register the network of the cell with different TAI when the current TAU is rejected by the network, thus effectively enhancing the success rate of registering the network.

Figure 3:
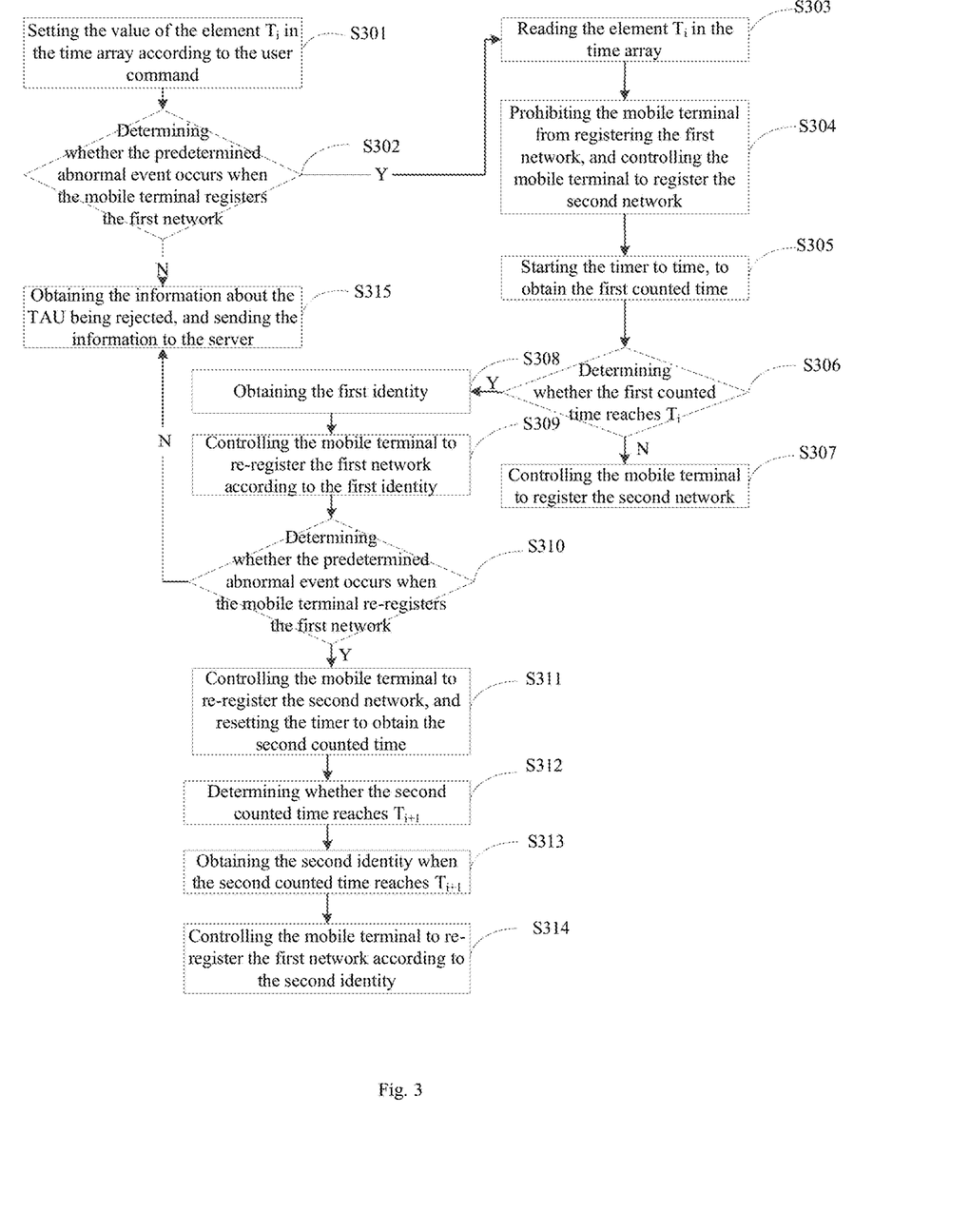
FIG. 3 is a flow chart of a network registration method of a mobile terminal according to another embodiment of the present disclosure.

FIG. 3 is a flow chart of a network registration method of a mobile terminal according to an embodiment of the present disclosure. The network registration method is configured in the network registration apparatus of the mobile terminal for illustration.

The network registration method of the mobile terminal includes following actions in blocks illustrated in FIG. 3. The method can begin at block S301.

At S301, the value of the element $T_i$ in the time array is set according to a user command.

In this embodiment, the value of the element $T_i$ in the time array may be preset by the user based on this own demand.

For example, the mobile terminal may receive the command input by the user on the screen, and sets the value of the element $T_i$ in the time array according to the user command. The values of the elements $T_i$ in the time array may be sequentially input by the user on the screen, or may be selectively input by the user, which is not limited.

In this action, the time $T_i$ of the time array is set by the user, and thus personalized setting of the time array may be realized, the generality of the network registration method of the mobile terminal may be improved, and the success rate of the network registration of the mobile terminal may be enhanced.

At S302, it is determined whether the predetermined abnormal event occurs when the mobile terminal registers the first network, and if yes, S303 is executed, and if no, S315 is executed.

Embodiments of the present disclosure are illustrated in a case in which the mobile terminal registers the 4G network.

The execution body of embodiments of the present disclosure may be, for example, a built-in modem of the mobile terminal.

Alternatively, the predetermined abnormal event includes TAU being rejected.

The first network is 4G network.

It can be understood that, during the procedure in which the user uses the mobile terminal to access the 4G network, a response indicting a failure of registering the network may occur, in which the failure of registering the network may be caused by the TAU being rejected, or may be caused by other reasons. This embodiment is applied in the procedure in which the mobile terminal registers the network, and is applied after the TAU is rejected.

Alternatively, it is possible to determine whether the event of the TAU being rejected by the network occurs during the mobile terminal registers the 4G network, to trigger subsequent actions.

At S303, the element $T_i$ in the time array is read, in which the time array is $\{T_1, T_2, \ldots, T_i, T_{i+1}, \ldots, T_n\}$, i is a positive integer between 1 and N, and N is a positive integer.

In embodiments of the present disclosure, when the mobile terminal fails to register the network due to the TAU being rejected, the time array may be started and the element $T_i$ in the time array may be read. For example, when the mobile terminal initially fails to register the first network, the element $T_1$ may be read from the time array $\{T_1, T_2, \ldots, T_i, T_{i+1}, \ldots, T_n\}$, and the mobile terminal is controlled to register the networks with different rate, for example, 2G network or 3G network, during the time interval of $T_1$, to ensure that the mobile terminal can normally access to Internet. When the mobile fails to register the first network the second time, the element $T_2$ may be read from the time array $\{T_1, T_2, \ldots, T_i, T_{i+1}, \ldots, T_n\}$, and so on. The element $T_i$ in the time array $\{T_1, T_2, \ldots, T_i, T_{i+1}, \ldots, T_n\}$ is read alternately, to enhance the success rate of registering the first network by the mobile terminal, which is not limited.

The value of the element $T_i$ in the time array may be set by the user based on his own demand, or may be preset by the manufacturer of the mobile terminal, which is not limited.

At S304, the mobile terminal is prohibited from registering the first network, and is controlled to register the second network.

In embodiments of the present disclosure, the second network has a transmission rate different from the first network. For example, the second network may be 2G network, or 3G network, which is not limited.

In embodiments of the present disclosure, when the mobile terminal initially fails to register the first network and when the mobile terminal fails to register the first network due to the TAU being rejected, it is possible to control the mobile terminal to switch to register the network with different rate, for example, 2G network or 3G network, in the time interval of $T_1$. Alternatively, when the mobile terminal alternately reads the element $T_i$ in the time array $\{T_1, T_2, \ldots, T_i, T_{i+1}, \ldots, T_n\}$, the mobile terminal may switch to register the network with different rate in the time interval of $T_i$, thus effectively ensuring that the mobile terminal can normally access to Internet.

At S305, the timer is started to time, to obtain the first counted time.

In embodiments of the present disclosure, while the mobile terminal is prohibited from registering the first network and is controlled to register the second network, the timer may be started to time, to obtain the first counted time. The mobile terminal may determine whether the duration of registering the second network reaches $T_i$ according to the first counted time, which is not limited.

At S306, it is determined whether the first counted time reaches $T_i$, and if yes, S308 is executed, and if no, S307 is executed.

In embodiments of the present disclosure, it is possible to determine whether the first counted time reaches $T_i$, to determine whether to trigger the mobile terminal to re-register the first network, which is not limited.

At S307, the mobile terminal is continuously controlled to register the second network.

In this action, by continuing to control the mobile terminal to register the second network when the first counted time does not reach $T_i$, it can ensure that the user can register the network with different rate when the TAU is rejected by the network, avoiding the connectionless network service state, and effectively improving the user experience.

At S308, the first identity is obtained, in which the first identity is the TAI of the adjacent cell of the cell where the mobile terminal is when registering the first network.

In embodiments of the present disclosure, when the first counted time reaches $T_i$, the TAI of the adjacent cell of the cell where the mobile terminal is when registering the first network may be obtained, to control the mobile terminal to re-register the first network according to the TAI of the adjacent cell.

The TAI of the adjacent cell of the cell where the mobile terminal is when registering the first network may be obtained by technologies in the related art, which will not be elaborated here.

At S309, the mobile terminal is controlled to re-register the first network according to the first identity.

In embodiments of the present disclosure, when the mobile terminal fails to register the first network the first time due to the TAU being rejected, the mobile terminal reads the element $T_1$ in the time array $\{T_1, T_2, \ldots, T_i, T_{i+1}, \ldots, T_n\}$. In the time interval of $T_1$, the mobile terminal is prohibited from registering the first network, but switches to register the second network, and accesses to the second network in the time interval of $T_1$. Then, when the counted time of the timer reaches $T_1$, the mobile terminal is controlled to re-register the first network according to the TAI of the adjacent cell. If the registration successes, the mobile terminal accesses to the first network. If the registration fails, the mobile terminal reads the element $T_2$ in the time array $\{T_1, T_2, \ldots, T_i, T_{i+1}, \ldots, T_n\}$ and resets the timer for timing again, and switches to register the second network again in the time interval of $T_2$. When the re-counted time reaches $T_2$, the mobile terminal is controlled to register the first network again according to the TAI of the adjacent cell of the cell where the mobile terminal is when registering the first network the second time. By that analogy, the element $T_i$ in the time array $\{T_1, T_2, \ldots, T_i, T_{i+1}, \ldots, T_n\}$ is read alternately, until the mobile terminal registers the first network successfully, which is not limited.

At S310, it is determined whether the predetermined abnormal event occurs when the mobile terminal re-registers the first network, and if yes, S311 is executed, and if no, S315 is executed.

It can be understood that, during the procedure in which the user uses the mobile terminal to access the 4G network, a response indicting a failure of registering the network may occur, in which the failure of registering the network may be caused by the TAU being rejected, or may be caused by other reasons.

Alternatively, it is determined whether the TAU is rejected by the network when the mobile terminal re-registers the first network, to trigger subsequent actions.

At S311, the mobile terminal is controlled to re-register the second network, and the timer is reset to time again to obtain the second counted time.

In embodiments of the present disclosure, when the mobile terminal fails to re-register the first network and when the mobile terminal fails to register the first network due to the TAU being rejected, it is possible to control the mobile terminal to switch to register the network with different rate, for example, 2G network or 3G network, in the time interval of $T_2$. Alternatively, when the mobile terminal alternately reads the element $T_{i+1}$ in the time array $\{T_1, T_2, \ldots, T_i, T_{i+1}, \ldots, T_n\}$, the mobile terminal may switch to register the network with different rate in the time interval of $T_{i+1}$, thus effectively ensuring that the mobile terminal can normally access to Internet.

While the mobile terminal is prohibited from registering the first network and is controlled to register the second network, the timer may be started to time, to obtain the second counted time. The mobile terminal may determine whether the duration of registering the second network reaches $T_{i+1}$ according to the second counted time, which is not limited.

At S312, it is determined whether the second counted time reaches $T_{i+1}$.

In embodiments of the present disclosure, it is possible to determine whether the second counted time reaches $T_{i+1}$, to determine whether to trigger the mobile terminal to re-register the first network, which is not limited.

At S313, when the second counted time reaches $T_{i+1}$, the second identity is obtained, in which the second identity is the TAI of the adjacent cell of the cell where the mobile terminal is when re-registering the first network.

In embodiments of the present disclosure, when the second counted time reaches $T_{i+1}$, the TAI of the adjacent cell of the cell where the mobile terminal is when re-registering the first network may be obtained, to control the mobile terminal to re-register the first network according to the TAI of the adjacent cell.

The TAI of the adjacent cell of the cell where the mobile terminal is when re-registering the first network may be obtained by technologies in the related art, which will not be elaborated here.

At S314, the mobile terminal is controlled to re-register the first network according to the second identity.

In embodiments of the present disclosure, when the mobile terminal fails to re-register the first network due to the TAU being rejected, the mobile terminal reads the element $T_2$ in the time array $\{T_1, T_2, \ldots, T_i, T_{i+1}, \ldots, T_n\}$. In the time interval of $T_2$, the mobile terminal is prohibited from registering the first network, but switches to register the second network, and accesses to the second network in the time interval of $T_2$. Then, when the counted time of the timer reaches $T_2$, the mobile terminal is controlled to re-register the first network according to the TAI of the adjacent cell. If the registration successes, the mobile terminal accesses to the first network. If the registration fails, the mobile terminal reads the element $T_3$ in the time array $\{T_1, T_2, \ldots, T_i, T_{i+1}, \ldots, T_n\}$ and resets the timer for timing again, and switches to register the second network again in the time interval of $T_3$. When the re-counted time reaches $T_3$, the mobile terminal is controlled to register the first network again according to the TAI of the adjacent cell of the cell where the mobile terminal is when registering the first network the second time. By that analogy, the element $T_i$ in the time array $\{T_1, T_2, \ldots, T_i, T_{i+1}, \ldots, T_n\}$ is read alternately, until the mobile terminal registers the first network successfully, which is not limited.

At S315, information about the TAU being rejected is obtained and sent to the server, such that the server backs up the predetermined abnormal event according to the information.

Alternatively, the mobile terminal obtains the information about the TAU being rejected by the network, and sends the information to the server, such that the server backs up the predetermined abnormal event according to the information.

In this embodiment, the time $T_i$ of the time array is set by the user, and thus personalized setting of the time array can be realized, and generality of the network registration method of the mobile terminal can be improved. By controlling the mobile terminal to register the second network when the predetermined abnormal event occurs during the mobile terminal registers the first network, it can ensure that the user registers the network successfully, and by obtaining the first identity (the TAI of the adjacent cell of the cell where the mobile terminal is when registering the first network) when the first counted time reaches $T_i$, obtaining the second identity (the TAI of the adjacent cell of the cell where the mobile terminal is when re-registering the first network) when the second counted time reaches $T_{i+1}$, and controlling the mobile terminal to re-register the first network according to the first identity or the second identity, the mobile terminal can register the network of the cell with different TAI when the current TAU is rejected by the network, thus effectively enhancing the success rate of registering the network.

In order to illustrate the actions of the above embodiments more clearly, an example is given as follows.

As an example, when the time array is {1 min, 6 min, 12 min}, it indicates that the mobile terminal reads the element 1 min in the time array {1 min, 6 min, 12 min} when the mobile terminal fails to register the 4G network the first time due to the TAU being rejected. In the time interval of 1 min, the mobile terminal is prohibited from registering the first network, and switches to register the 2G or 3G network. The mobile terminal accesses to the 2G or 3G network in the time interval of 1 min. then, when the counted time of the timer reaches 1 min, the mobile terminal is controlled to re-register the 4G network according to the TAI of the adjacent cell. If the registration successes, the mobile terminal accesses to the 4G network. If the registration fails, the mobile terminal reads the element 6 min in the time array {1 min, 6 min, 12 min}, and re-starts the timer for timing. In the time interval of 6 min, the mobile terminal switches to register the 2G or 3G network again. When the re-counted time reaches 6 min, the mobile terminal is controlled to register the 4G network again according to the TAI of the adjacent cell of the cell where the mobile terminal is when registering the 4G network the second time. If the registration successes, the mobile terminal accesses to the 4G network. If the registration fails, the mobile terminal reads the last element 12 min in the time array {1 min, 6 min, 12 min} and re-starts the timer for timing. In the time interval of 12 min, the mobile terminal switches to register the 2G or 3G network again. When the re-counted time reaches 12 min, the mobile terminal is controlled to register the 4G network again according to the TAI of the adjacent cell of the cell where the mobile terminal is when registering the 4G network the third time. By that analogy, the mobile terminal then re-searches for the 4G network every 12 min. In this way, it can ensure that the user can register the network with other rate when the TAU is rejected by the network, avoiding the connectionless network service state.

Figure 4:
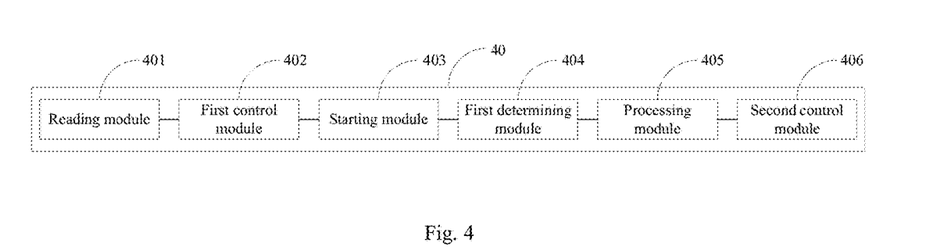
FIG. 4 is a block diagram of a network registration apparatus of a mobile terminal according to an embodiment of the present disclosure.

FIG. 4 is a block diagram of a network registration apparatus of a mobile terminal according to an embodiment of the present disclosure. The network registration apparatus 40 of the mobile terminal may be implemented by software, hardware, or the combination thereof. The network registration apparatus 40 of the mobile terminal may include a reading module 401, a first control module 402, a starting module 403, a first determining module 404, a processing module 405 and a second control module 406.

The reading module 401 is configured to read an element $T_i$ in a time array $\{T_1, T_2, \ldots, T_i, T_{i+1}, \ldots, T_n\}$ in response to determining that a predetermined abnormal event occurs when the mobile terminal registers a first network, in which i is a positive integer between 1 and N, and N is a positive integer.

Alternatively, the predetermined abnormal event includes the TAU being rejected.

The first control module 402 is configured to prohibit the mobile terminal from registering the first network, and control the mobile terminal to register a second network.

The starting module 403 is configured to start a timer for timing, to obtain a first counted time.

The first determining module 404 is configured to determine whether the first counted time reaches $T_i$.

The processing module 405 is configured to obtain a first identity when the first counted time reaches $T_i$, in which the first identity is a tracking area identity of an adjacent cell of a cell where the mobile terminal is when registering the first network.

The second control module 406 is configured to control the mobile terminal to re-register the first network according to the first identity.

Figure 5:
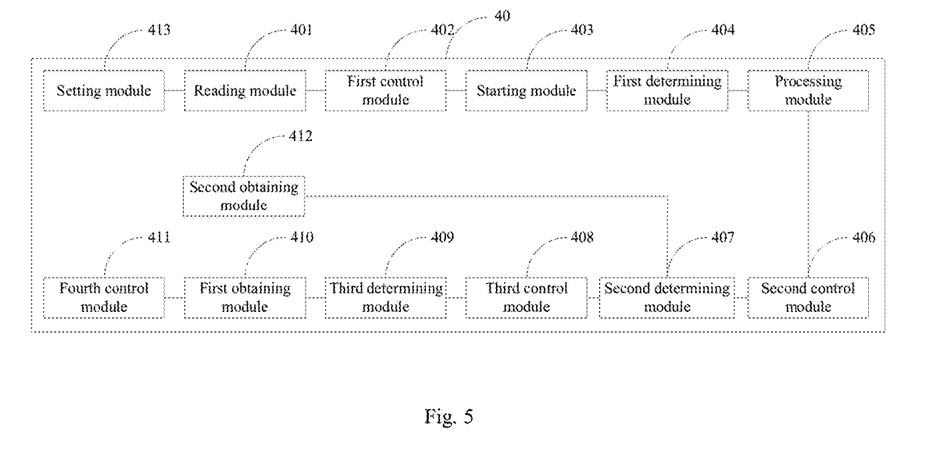
FIG. 5 is a block diagram of a network registration apparatus of a mobile terminal according to another embodiment of the present disclosure.

Alternatively, in some embodiments, as illustrated in FIG. 5, the network registration apparatus 40 of the mobile terminal may further include a second determining module 407, a third control module 408, a third determining module 409, a first obtaining module 410, a fourth control module 411, a second obtaining module 412, and a setting module 413.

The second determining module 407 is configured to determine whether the predetermined abnormal event occurs when the mobile terminal re-registers the first network.

The third control module 408 is configured to, when the predetermined abnormal event occurs, control the mobile terminal to re-register the second network, and reset the timer for timing again to obtain a second counted time.

The third determining module 409 is configured to determine whether the second counted time reaches $T_{i+1}$.

The first obtaining module 410 is configured to obtain a second identity when the second counted time reaches $T_{i+1}$, in which the second identity is a tracking area identity of an adjacent cell of a cell where the mobile terminal is when re-registering the first network.

The fourth control module 411 is configured to control the mobile terminal to re-register the first network according to the second identity.

Alternatively, the processing module 405 is further configured to continue to control the mobile terminal to register the second network when the first counted time does not reach $T_i$.

The second obtaining module 412 is configured to obtain information about the TAU being rejected, and send the information to a server, such that the server backs up the predetermined abnormal event according to the information.

The setting module 413 is configured to set a value of the element $T_i$ in the time array according to a user command.

It should be noted that, the explanation to embodiments of the network registration method of the mobile terminal with reference to FIGS. 1-3 is applicable to the network registration apparatus of the mobile terminal, which has similar principle, and will not be elaborated here.

In this embodiment, by controlling the mobile terminal to register the second network when the predetermined abnormal event occurs during the mobile terminal registers the first network, it can ensure that the user registers the network successfully, and by obtaining the first identity (the TAI of the adjacent cell of the cell where the mobile terminal is when registering the first network) when the first counted time reaches $T_i$ and controlling the mobile terminal to re-register the first network according to the first identity, the mobile terminal can register the network of the cell with different TAI when the current TAU is rejected by the network, thus effectively enhancing the success rate of registering the network.

Embodiments of the present disclosure further provide a mobile terminal. The mobile terminal includes a housing, a processor, a memory, a circuit board and a power supply circuit. The circuit board is disposed inside a space enclosed by the housing. The processor and the memory are disposed on the circuit board. The power supply circuit is configured to supply power for respective circuits or components of the mobile terminal. The memory is configured to store executable program codes. The processor is configured to run a program corresponding to the executable program codes by reading the executable program codes stored in the memory, so as to perform following actions.

At S11', an element $T_i$ in a time array is read in response to determining that a predetermined abnormal event occurs when the mobile terminal registers a first network, in which the time array is $\{T_1, T_2, \ldots, T_i, T_{i+1}, \ldots, T_n\}$, i is a positive integer between 1 and N, and N is a positive integer.

Embodiments of the present disclosure are illustrated in a case in which the mobile terminal registers the 4G network.

The execution body of embodiments of the present disclosure may be, for example, a built-in modem of the mobile terminal.

Alternatively, the predetermined abnormal event includes TAU being rejected.

The first network is 4G network.

It can be understood that, during the procedure in which the user uses the mobile terminal to access the 4G network, a response indicting a failure of registering the network may occur, in which the failure of registering the network may be caused by the TAU being rejected, or may be caused by other reasons.

In embodiments of the present disclosure, when the mobile terminal fails to register the network due to the TAU being rejected, the time array may be started and the element $T_i$ in the time array may be read. For example, when the mobile terminal initially fails to register the first network, the element $T_1$ may be read from the time array $\{T_1, T_2, \ldots, T_i, T_{i+1}, \ldots, T_n\}$, and the mobile terminal is controlled to register the network with different rate, for example, 2G network or 3G network, during the time interval of $T_1$, to ensure that the mobile terminal can normally access to Internet. When the mobile fails to register the first network the second time, the element $T_2$ may be read from the time array $\{T_1, T_2, \ldots, T_i, T_{i+1}, \ldots, T_n\}$, and so on. The element $T_i$ in the time array $\{T_1, T_2, \ldots, T_i, T_{i+1}, \ldots, T_n\}$ is read alternately, to enhance the success rate of registering the first network by the mobile terminal, which is not limited.

A value of the element $T_i$ in the time array may be set by the user based on his own demand, or may be preset by the manufacturer of the mobile terminal, which is not limited.

At S12', the mobile terminal is prohibited from registering the first network, and is controlled to register a second network.

In embodiments of the present disclosure, the second network has a transmission rate different from the first network. For example, the second network may be 2G network, or 3G network, which is not limited.

In embodiments of the present disclosure, when the mobile terminal initially fails to register the first network and when the mobile terminal fails to register the first network due to the TAU being rejected, it is possible to control the mobile terminal to switch to register the network with different rate, for example, 2G network or 3G network, in the time interval of $T_1$. Alternatively, when the mobile terminal alternately reads the element $T_i$ in the time array $\{T_1, T_2, \ldots, T_i, T_{i+1}, \ldots, T\}$, the mobile terminal may switch to register the network with different rate in the time interval of $T_i$, thus effectively ensuring that the mobile terminal can normally access to Internet.

At S13', the timer is started to time, to obtain a first counted time.

In embodiments of the present disclosure, while the mobile terminal is prohibited from registering the first network and is controlled to register the second network, the timer may be started to time, to obtain the first counted time. The mobile terminal may determine whether the duration of registering the second network reaches $T_i$ according to the first counted time, which is not limited.

At S14', it is determined whether the first counted time reaches $T_i$.

In embodiments of the present disclosure, it is possible to determine whether the first counted time reaches $T_i$, to determine whether to trigger the mobile terminal to re-register the first network, which is not limited.

In another embodiment, the processor is configured to run a program corresponding to the executable program codes by reading the executable program codes stored in the memory, so as to perform following action.

At S21', when the first counted time does not reach $T_1$, the mobile terminal is continuously controlled to register the second network.

In this action, by continuing to control the mobile terminal to register the second network when the first counted time does not reach $T_i$, it can ensure that the user can register the network with different rate when the TAU is rejected by the network, avoiding the connectionless network service state, and effectively improving the user experience.

At S15', when the first counted time reaches $T_i$, a first identity is obtained, in which the first identity is the TAI of an adjacent cell of a cell where the mobile terminal is when registering the first network.

In embodiments of the present disclosure, when the first counted time reached $T_i$, the TAI of the adjacent cell of the cell where the mobile terminal is when registering the first network may be obtained, to control the mobile terminal to re-register the first network according to the TAI of the adjacent cell.

The TAI of the adjacent cell of the cell where the mobile terminal is when registering the first network may be obtained by technologies in the related art, which will not be elaborated here.

At S16', the mobile terminal is controlled to re-register the first network according to the first identity.

In embodiments of the present disclosure, when the mobile terminal fails to register the first network the first time due to the TAU being rejected, the mobile terminal reads the element $T_1$ in the time array $\{T_1, T_2, \ldots, T_i, T_{i+1}, \ldots, T_n\}$. In the time interval of $T_1$, the mobile terminal is prohibited from registering the first network, but switches to register the second network, and accesses to the second network in the time interval of $T_1$. Then, when the counted time of the times reaches $T_1$, the mobile terminal is controlled to re-register the first network according to the TAI of the adjacent cell. If the registration successes, the mobile terminal accesses to the first network. If the registration fails, the mobile terminal reads the element $T_2$ in the time array $\{T_1, T_2, \ldots, T_i, T_{i+1}, \ldots, T\}$ and resets the timer for timing again, and switches to register the second network again in the time interval of $T_2$. When the re-counted time reaches $T_2$, the mobile terminal is controlled to register the first network again according to the TAI of the adjacent cell of the cell where the mobile terminal is when registering the first network the second time. By that analogy, the element $T_i$ in the time array $\{T_1, T_2, \ldots, T_i, T_{i+1}, \ldots, T_n\}$ is read alternately, until the mobile terminal registers the first network successfully, which is not limited.

In this embodiment, by controlling the mobile terminal to register the second network when the predetermined abnormal event occurs during the mobile terminal registers the first network, it can ensure that the user registers the network successfully, and by obtaining the first identity (the TAI of the adjacent cell of the cell where the mobile terminal is when registering the first network) when the first counted time reaches $T_i$, and controlling the mobile terminal to re-register the first network according to the first identity, the mobile terminal can register the network of the cell with different TAI when the current TAU is rejected by the network, thus effectively enhancing the success rate of registering the network.

In another embodiment, the processor is configured to run a program corresponding to the executable program codes by reading the executable program codes stored in the memory, so as to perform following actions.

At S301', the value of the element $T_i$ in the time array is set according to a user command.

In this embodiment, the value of the element $T_i$ in the time array may be preset by the user based on this own demand.

For example, the mobile terminal may receive the command input by the user on the screen, and sets the value of the element $T_i$ in the time array according to the user command. The values of the elements $T_i$ in the time array may be sequentially input by the user on the screen, or may be selectively input by the user, which is not limited.

In this action, the time $T_i$ of the time array is set by the user, and thus personalized setting of the time array may be realized, the generality of the network registration method of the mobile terminal may be improved, and the success rate of the network registration of the mobile terminal may be enhanced.

At S302', it is determined whether the predetermined abnormal event occurs when the mobile terminal registers the first network, and if yes, S303 is executed, and if no, S315 is executed.

Embodiments of the present disclosure are illustrated in a case in which the mobile terminal registers the 4G network.

The execution body of embodiments of the present disclosure may be, for example, a built-in modem of the mobile terminal.

Alternatively, the predetermined abnormal event includes TAU being rejected.

The first network is 4G network.

It can be understood that, during the procedure in which the user uses the mobile terminal to access the 4G network, a response indicting a failure of registering the network may occur, in which the failure of registering the network may be caused by the TAU being rejected, or may be caused by other reasons. This embodiment is applied in the procedure in which the mobile terminal registers the network, and is applied after the TAU is rejected.

Alternatively, it is possible to determine whether the event of the TAU being rejected by the network occurs during the mobile terminal registers the 4G network, to trigger subsequent actions.

At S303', the element $T_i$ in the time array is read, in which the time array is $\{T_1, T_2, \ldots, T_i, T_{i+1}, \ldots, T_n\}$, i is a positive integer between 1 and N, and N is a positive integer.

In embodiments of the present disclosure, when the mobile terminal fails to register the network due to the TAU being rejected, the time array may be started and the element $T_i$ in the time array may be read. For example, when the mobile terminal initially fails to register the first network, the element $T_1$ may be read from the time array $\{T_1, T_2, \ldots, T_i, T_{i+1}, \ldots, T_n\}$, and the mobile terminal is controlled to register the network with different rate, for example, 2G network or 3G network, during the time interval of $T_1$, to ensure that the mobile terminal can normally access to Internet. When the mobile fails to register the first network the second time, the element $T_2$ may be read from the time array $\{T_1, T_2, \ldots, T_i, T_{i+1}, \ldots, T_n\}$, and so on. The element $T_i$ in the time array $\{T_1, T_2, \ldots, T_i, T_{i+1}, \ldots, T_n\}$ is read alternately, to enhance the success rate of registering the first network by the mobile terminal, which is not limited.

The value of the element $T_i$ in the time array may be set by the user based on his own demand, or may be preset by the manufacturer of the mobile terminal, which is not limited.

At S304', the mobile terminal is prohibited from registering the first network, and is controlled to register the second network.

In embodiments of the present disclosure, the second network has a transmission rate different from the first network. For example, the second network may be 2G network, or 3G network, which is not limited.

In embodiments of the present disclosure, when the mobile terminal initially fails to register the first network and when the mobile terminal fails to register the first network due to the TAU being rejected, it is possible to control the mobile terminal to switch to register the network with different rate, for example, 2G network or 3G network, in the time interval of $T_1$. Alternatively, when the mobile terminal alternately reads the element $T_i$ in the time array $\{T_1, T_2, \ldots, T_i, T_{i+1}, \ldots, T_n\}$, the mobile terminal may switch to register the network with different rate in the time interval of $T_i$, thus effectively ensuring that the mobile terminal can normally access to Internet.

At S305', the timer is started to time, to obtain the first counted time.

In embodiments of the present disclosure, while the mobile terminal is prohibited from registering the first network and is controlled to register the second network, the timer may be started to time, to obtain the first counted time. The mobile terminal may determine whether the duration of registering the second network reaches $T_i$ according to the first counted time, which is not limited.

At S306', it is determined whether the first counted time reaches $T_i$, and if yes, S308 is executed, and if no, S307 is executed.

In embodiments of the present disclosure, it is possible to determine whether the first counted time reaches $T_i$, to determine whether to trigger the mobile terminal to re-register the first network, which is not limited.

At S307', the mobile terminal is continuously controlled to register the second network.

In this action, by continuing to control the mobile terminal to register the second network when the first counted time does not reach $T_i$, it can ensure that the user can register the network with different rate when the TAU is rejected by the network, avoiding the connectionless network service state, and effectively improving the user experience.

At S308', the first identity is obtained, in which the first identity is the TAI of the adjacent cell of the cell where the mobile terminal is when registering the first network.

In embodiments of the present disclosure, when the first counted time reaches $T_i$, the TAI of the adjacent cell of the cell where the mobile terminal is when registering the first network may be obtained, to control the mobile terminal to re-register the first network according to the TAI of the adjacent cell.

The TAI of the adjacent cell of the cell where the mobile terminal is when registering the first network may be obtained by technologies in the related art, which will not be elaborated here.

At S309', the mobile terminal is controlled to re-register the first network according to the first identity.

In embodiments of the present disclosure, when the mobile terminal fails to register the first network the first time due to the TAU being rejected, the mobile terminal reads the element $T_1$ in the time array $\{T_1, T_2, \ldots, T_i, T_{i+1}, \ldots, T_n\}$. In the time interval of $T_1$, the mobile terminal is prohibited from registering the first network, but switches to register the second network, and accesses to the second network in the time interval of $T_1$. Then, when the counted time of the timer reaches $T_1$, the mobile terminal is controlled to re-register the first network according to the TAI of the adjacent cell. If the registration successes, the mobile terminal accesses to the first network. If the registration fails, the mobile terminal reads the element $T_2$ in the time array $\{T_1, T_2, \ldots, T_i, T_{i+1}, \ldots, T_n\}$ and resets the timer for timing again, and switches to register the second network again in the time interval of $T_2$. When the re-counted time reaches $T_2$, the mobile terminal is controlled to register the first network again according to the TAI of the adjacent cell of the cell where the mobile terminal is when registering the first network the second time. By that analogy, the element $T_i$ in the time array $\{T_1, T_2, \ldots, T_i, T_{i+1}, \ldots, T_n\}$ is read alternately, until the mobile terminal registers the first network successfully, which is not limited.

At S310', it is determined whether the predetermined abnormal event occurs when the mobile terminal re-registers the first network, and if yes, S311 is executed, and if no, S315 is executed.

It can be understood that, during the procedure in which the user uses the mobile terminal to access the 4G network, a response indicting a failure of registering the network may occur, in which the failure of registering the network may be caused by the TAU being rejected, or may be caused by other reasons.

Alternatively, it is determined whether the TAU is rejected by the network when the mobile terminal re-registers the first network, to trigger subsequent actions.

At S311', the mobile terminal is controlled to re-register the second network, and the timer is reset to time again to obtain the second counted time.

In embodiments of the present disclosure, when the mobile terminal fails to re-register the first network and when the mobile terminal fails to register the first network due to the TAU being rejected, it is possible to control the mobile terminal to switch to register the network with different rate, for example, 2G network or 3G network, in the time interval of $T_2$. Alternatively, when the mobile terminal alternately reads the element $T_{i+1}$ in the time array $\{T_1, T_2, \ldots, T_i, T_{i+1}, \ldots, T_n\}$, the mobile terminal may switch to register the network with different rate in the time interval of $T_{i+1}$, thus effectively ensuring that the mobile terminal can normally access to Internet.

While the mobile terminal is prohibited from registering the first network and is controlled to register the second network, the timer may be started to time, to obtain the second counted time. The mobile terminal may determine whether the duration of registering the second network reaches $T_{i+1}$ according to the second counted time, which is not limited.

At S312', it is determined whether the second counted time reaches $T_{i+1}$.

In embodiments of the present disclosure, it is possible to determine whether the second counted time reaches $T_{i+1}$, to determine whether to trigger the mobile terminal to re-register the first network, which is not limited.

At S313', when the second counted time reaches $T_{i+1}$, the second identity is obtained, in which the second identity is the TAI of the adjacent cell of the cell where the mobile terminal is when re-registering the first network.

In embodiments of the present disclosure, when the second counted time reaches $T_{i+1}$, the TAI of the adjacent cell of the cell where the mobile terminal is when re-registering the first network may be obtained, to control the mobile terminal to re-register the first network according to the TAI of the adjacent cell.

The TAI of the adjacent cell of the cell where the mobile terminal is when re-registering the first network may be obtained by technologies in the related art, which will not be elaborated here.

At S314', the mobile terminal is controlled to re-register the first network according to the second identity.

In embodiments of the present disclosure, when the mobile terminal fails to re-register the first network due to the TAU being rejected, the mobile terminal reads the element $T_2$ in the time array $\{T_1, T_2, \ldots, T_i, T_{i+1}, \ldots, T_n\}$. In the time interval of $T_2$, the mobile terminal is prohibited from registering the first network, but switches to register the second network, and accesses to the second network in the time interval of $T_2$. Then, when the counted time of the timer reaches $T_2$, the mobile terminal is controlled to re-register the first network according to the TAI of the adjacent cell. If the registration successes, the mobile terminal accesses to the first network. If the registration fails, the mobile terminal reads the element $T_3$ in the time array $\{T_1, T_2, \ldots, T_i, T_{i+1}, \ldots, T_n\}$ and resets the timer for timing again, and switches to register the second network again in the time interval of $T_3$. When the re-counted time reaches $T_3$, the mobile terminal is controlled to register the first network again according to the TAI of the adjacent cell of the cell where the mobile terminal is registered when registering the first network the second time. By that analogy, the element $T_i$ in the time array $\{T_1, T_2, \ldots, T_i, T_{i+1}, \ldots, T_n\}$ is read alternately, until the mobile terminal registers the first network successfully, which is not limited.

At S315', information about the TAU being rejected is obtained and sent to the server, such that the server backs up the predetermined abnormal event according to the information.

Alternatively, the mobile terminal obtains the information about the TAU being rejected by the network, and sends the information to the server, such that the server backs up the predetermined abnormal event according to the information.

In this embodiment, the time $T_i$ of the time array is set by the user, and thus personalized setting of the time array can be realized, and generality of the network registration method of the mobile terminal can be improved. By controlling the mobile terminal to register the second network when the predetermined abnormal event occurs during the mobile terminal registers the first network, it can ensure that the user registers the network successfully, and by obtaining the first identity (the TAI of the adjacent cell of the cell where the mobile terminal is when registering the first network) when the first counted time reaches $T_i$, obtaining the second identity (the TAI of the adjacent cell of the cell where the mobile terminal is when re-registering the first network) when the second counted time reaches $T_{i+1}$, and controlling the mobile terminal to re-register the first network according to the first identity or the second identity, the mobile terminal can register the network of the cell with different TAI when the current TAU is rejected by the network, thus effectively enhancing the success rate of registering the network.

The apparatus embodiments described above are merely illustrative, in which the units illustrated as separate components may be or may be not separated physically, components illustrated as units may be or may be not physical units, i.e., may be located in one space, or may be distributed to a plurality of network units. Some or all of the modules may be selected based on actual demands to implement objectives of the present disclosure. Those skilled in the art can understand and implement the present disclosure without creative labor.

Actions in method embodiments of the present disclosure may be adjusted, combined, or deleted based on actual demands.

Modules or units in apparatus embodiments of the present disclosure may be combined, divided, and deleted based on actual demands.

Modules or units in embodiments of the present disclosure may be implemented by a general integrated circuit (such as a CPU), or an application-specific integrated circuit (ASIC).

With the above description of embodiments, the person skilled in the art can clearly understand that, various embodiments can be implemented by software together with necessary general hardware platform, or by hardware. Based on this understanding, the essential or the part contributing to the related art of the above technical solutions may be embodied in a form of software product. The computer software product may be stored in a computer-readable storage medium, for example, ROM/RAM, disk and CD, and may include several instructions configured to cause a computer device (which may be a personal computer, a server, or a network device) to execute the methods described by various embodiments or some parts of the embodiments.

The implementation described above does not intend to constitute limitation to the protection scope of the present disclosure. Any modification, equivalent, or improvement made in the principle and scope of the present disclosure are included in the protection scope of the technical solution.

What is claimed is:

1. A network registration method of a mobile terminal, comprising:

reading an element $T_i$ in a time array $\{T_1, T_2, \ldots, T_i, \ldots, T_n\}$ in response to determining that a predetermined abnormal event occurs when the mobile terminal registers a first network, wherein i is a positive integer between 1 and N, and N is a positive integer, the predetermined abnormal event comprises tracking area update (TAU) being rejected, values of the elements $T_i$ in the time array are sequentially input by the user on the screen or selectively input by the user;

prohibiting the mobile terminal from registering the first network, and controlling the mobile terminal to register a second network;

starting a timer for timing, to obtain a first counted time;

determining whether the first counted time reaches $T_i$;

obtaining a first identity when the first counted time reaches $T_i$, wherein the first identity is a tracking area identity of an adjacent cell of a cell where the mobile terminal is registered when registering the first network; and controlling the mobile terminal to re-register the first network according to the first identity;

wherein after controlling the mobile terminal to re-register the first network according to the first identity, the method further comprises:

determining whether the predetermined abnormal event occurs when the mobile terminal re-registers the first network;

when the predetermined abnormal event occurs, controlling the mobile terminal to re-register the second network, and resetting the timer for timing again to obtain a second counted time;

alternately reading an element $T_{i+1}$ in the time array $\{T_1, T_2, \ldots, T_i, \ldots, T_n\}$, and determining whether the second counted time reaches $T_{i+1}$;

obtaining a second identity when the second counted time reaches $T_{i+1}$, wherein the second identity is a tracking area identity of an adjacent cell of a cell where the mobile terminal is registered when re-registering the first network; and controlling the mobile terminal to re-register the first network according to the second identity;

obtaining information about TAU being rejected, and sending the information to a server, such that the server backs up the predetermined abnormal event according to the information.

2. The method according to claim 1, wherein after determining whether the first counted time reaches $T_i$, the method further comprises:

continuing to control the mobile terminal to register the second network when the first counted time does not reach $T_i$.

3. The method according to claim 2, further comprising: setting a value of the element $T_i$ in the time array according to a user command.

4. The method according to claim 1, further comprising: setting a value of the element $T_i$ in the time array according to a user command.

5. A mobile terminal, comprising:
a housing;
a processor;
a memory; and
a circuit board and a power supply circuit,
wherein, the circuit board is disposed inside a space enclosed by the housing; the processor and the memory are disposed on the circuit board; the power supply circuit is configured to supply power for respective circuits or components of the mobile terminal; the memory is configured to store executable program codes; and the processor is configured to run a program corresponding to the executable program codes by reading the executable program codes stored in the memory, so as to perform:

reading an element $T_i$ in a time array $\{T_1, T_2, \ldots, T_i, \ldots, T_n\}$ in response to determining that a predetermined abnormal event occurs when the mobile terminal registers a first network, wherein i is a positive integer between 1 and N, and N is a positive integer, the predetermined abnormal event comprises tracking area update (TAU) being rejected, values of the elements $T_i$ in the time array are sequentially input by the user on the screen or selectively input by the user;

prohibiting the mobile terminal from registering the first network, and controlling the mobile terminal to register a second network;

starting a timer for timing, to obtain a first counted time;

determining whether the first counted time reaches $T_i$;

obtaining a first identity when the first counted time reaches $T_i$, wherein the first identity is a tracking area identity of an adjacent cell of a cell where the mobile terminal is registered when registering the first network; and controlling the mobile terminal to re-register the first network according to the first identity;

wherein the processor is further configured to:

determine whether the predetermined abnormal event occurs when the mobile terminal re-registers the first network;

when the predetermined abnormal event occurs, control the mobile terminal to re-register the second network, and reset the timer for timing again to obtain a second counted time;

alternately read an element $T_{i+1}$ in the time array $\{T_1, T_2, \ldots, T_i, \ldots, T_n\}$, and determine whether the second counted time reaches $T_{i+1}$;

obtain a second identity when the second counted time reaches $T_{i+1}$, wherein the second identity is a tracking area identity of an adjacent cell of a cell where the mobile terminal is when re-registering the first network; and control the mobile terminal to re-register the first network according to the second identity;

obtain information about TAU being rejected, and sending the information to a server, such that the server backs up the predetermined abnormal event according to the information.

6. The mobile terminal according to claim 5, wherein the processor is further configured to:

continue to control the mobile terminal to register the second network when the first counted time does not reach $T_i$.

7. The mobile terminal according to claim 6, wherein the processor is further configured to:

set a value of the element $T_i$ in the time array according to a user command.

8. The mobile terminal according to claim 5, wherein the processor is further configured to:

set a value of the element $T_i$ in the time array according to a user command.

9. A non-transitory computer-readable storage medium, having stored therein instructions that, when executed by a processor of a mobile terminal, cause the mobile terminal to execute a network registration method, comprising:

reading an element $T_i$ in a time array $\{T_1, T_2, \ldots, T_i, \ldots, T_n\}$ in response to determining that a predetermined abnormal event occurs when the mobile terminal registers a first network, wherein i is between 1 and N, and N is a positive integer, the predetermined abnormal event comprises tracking area update (TAU) being rejected, values of the elements $T_i$ in the time array are sequentially input by the user on the screen or selectively input by the user;

prohibiting the mobile terminal from registering the first network, and controlling the mobile terminal to register a second network;

starting a timer for timing, to obtain a first counted time;

determining whether the first counted time reaches $T_i$;

obtaining a first identity when the first counted time reaches $T_i$, wherein the first identity is a tracking area identity of an adjacent cell of a cell where the mobile terminal is registered when registering the first network; and controlling the mobile terminal to re-register the first network according to the first identity;

wherein after controlling the mobile terminal to re-register the first network according to the first identity, the method further comprises:

determining whether the predetermined abnormal event occurs when the mobile terminal re-registers the first network;

when the predetermined abnormal event occurs, controlling the mobile terminal to re-register the second network, and resetting the timer for timing again to obtain a second counted time;

alternately reading an element $T_{i+1}$ in the time array $\{T_1, T_2, \ldots, T_i, \ldots, T_n\}$, and determining whether the second counted time reaches $T_{i+1}$;

obtaining a second identity when the second counted time reaches $T_{i+1}$, wherein the second identity is a tracking area identity of an adjacent cell of a cell where the mobile terminal is registered when re-registering the first network; and controlling the mobile terminal to re-register the first network according to the second identity;

obtaining information about TAU being rejected, and sending the information to a server, such that the server backs up the predetermined abnormal event according to the information.

10. The non-transitory computer-readable storage medium according to claim 9, wherein after determining whether the first counted time reaches $T_i$, the method further comprises:

continuing to control the mobile terminal to register the second network when the first counted time does not reach $T_i$.

11. The non-transitory computer-readable storage medium according to claim 10, further comprising:

setting a value of the element $T_i$ in the time array according to a user command.

12. The non-transitory computer-readable storage medium according to claim 9, further comprising:

setting a value of the element $T_i$ in the time array according to a user command.

* * * * *